United States Patent
Cadman

[19]

[11] Patent Number: 5,485,401
[45] Date of Patent: Jan. 16, 1996

[54] METHOD AND APPARATUS FOR TESTING OVERFILL PROTECTION DEVICES

[75] Inventor: Gary R. Cadman, Norwell, Mass.

[73] Assignee: Scully Signal Company, Wilmington, Mass.

[21] Appl. No.: 77,012

[22] Filed: Jun. 14, 1993

[51] Int. Cl.[6] .................................................. G01F 23/00
[52] U.S. Cl. ............... 364/551.01; 364/550; 364/571.05; 324/696; 324/699; 73/290 R; 73/304 R
[58] Field of Search ............................ 364/551.01, 550, 364/571.05; 340/620, 621, 624; 73/49.2 T, 149, 290 R, 304 R; 324/696, 699

[56] References Cited

U.S. PATENT DOCUMENTS

| | | | |
|---|---|---|---|
| 3,745,338 | 7/1973 | Joyce | 73/149 |
| 4,280,126 | 7/1981 | White | 340/621 |
| 4,316,183 | 2/1982 | Palmer et al. | 340/621 |
| 4,441,157 | 4/1984 | Gerchman et al. | 364/550 |
| 4,451,894 | 5/1984 | Dougherty et al. | 364/550 |
| 4,482,891 | 11/1984 | Spencer | 340/620 |
| 4,497,204 | 2/1985 | Kobayashi | 340/620 |
| 4,545,020 | 10/1985 | Brasfield | 364/571.05 |
| 4,637,254 | 1/1987 | Dyben et al. | 340/624 |
| 4,804,944 | 2/1989 | Golloday et al. | 340/624 |
| 4,984,449 | 1/1991 | Caldwell et al. | 73/49.2 T |

*Primary Examiner*—Emanuel T. Voeltz
*Assistant Examiner*—Alan Tran
*Attorney, Agent, or Firm*—Bookstein & Kudirka

[57] ABSTRACT

The present invention resides in a probe excitation and testing ("PET") system that can apply either a normal excitation or a "small" bias test excitation to overfill protection probes mounted within storage and transport tanks used to store, e.g., flammable fluids. The PET system applies the normal excitation for normal operation of the probes to provide overfill protection, and applies a "small" bias test excitation to the probes for performing diagnostic tests, including anti-cheating. The PET system can also perform a probe signature validation test under normal excitation to ascertain whether the probes are responding thereto in accordance with specifications relating to characteristic parameters of the probes' output waveforms, e.g., duty cycle, magnitude, and period.

14 Claims, 8 Drawing Sheets

METHOD AND APPARATUS FOR TESTING OVERFILL PROTECTION DEVICES

BACKGROUND OF THE INVENTION

A. Field of the Invention

This invention relates generally to electronic overfill protection devices for storage or transport tanks, and more particularly to a method and apparatus for performing diagnostic testing of the operation and electrical wiring integrity of the overfill protection devices.

B. Description of the Related Art

Tanks used for storing or transporting flammable fluids such as gasoline, diesel fuel and other hazardous petroleum products are often equipped with overfill protection devices to protect the environment.

The tanks can be mounted on tanker trucks or located underground at service stations. Tanker trucks are typically filled with the fluids using pumping equipment at loading racks of marketing terminals, and underground storage tanks are typically gravity filled from the trucks. An overfill protection device is used with each tank to disable the pumping equipment at the marketing terminals or close a truck-mounted flow valve at the service station when the limit of the tank's capacity is reached.

The overfill protection device typically has a detection circuit and a disable circuit. One or more probes, each located within a tank, are connected to the detection circuit over a separate channel. Each probe generates an electrical sensor signal that indicates when the fluid within the tank exceeds a pre-determined level. The detection circuit has a controller mounted near the tank (e.g., on the tanker truck or at the service station) that controls the operation of the probes. The detection and disable circuits are interconnected by a suitable electrical cable. In response to the sensor signal indicating that a particular tank is full, the disable circuit operates to stop flow into that tank (e.g., by disabling the pumping equipment at the loading rack or by closing the flow valve on the truck).

For applications involving filling of tanks with hazardous materials, the overfill protection device should be designed and operated in an "intrinsically safe" manner, and preferably be "fail safe." As defined in applicable standards promulgated by various governmental agencies and industrial organizations, an intrinsically safe circuit cannot produce any spark or thermal effect, either normally or in any likely fault condition, which is capable of causing the ignition of a mixture of the flammable fluid and its vapor or other combustible material in air.

"Fail safe" means that no single failure of a component or wiring in the overfill protection device will cause overfilling of the tank. From a practical standpoint, fail safe operation requires that designers of overfill protection devices anticipate failure modes for the devices, and devise preventive measures or build in redundancy of the components or wiring that are likely to fail.

While conventional intrinsically safe, fail-safe ("IS-FS") overfill protection devices are generally suitable for their intended applications, they do have drawbacks. Conventional IS-FS overfill protection devices generally lack any sophisticated diagnostic testing capability of validating that the probes are correctly wired and functional as intended. A conventional IS-FS overfill protection device is typically tested at most for a short circuit between the probe and ground, for an "open" connection to the probe, and to confirm the presence of an output signal from the probe. Such tests are performed under the normal operating excitations for the probes and use simple, conventional comparator logic.

Such testing by a conventional IS-FS overfill protection device cannot detect many common probe wiring problems, including those arising from corrosion and aging effects on wiring or probe-connections, accidental mis-wiring of probes, and so-called "cheating". Cheating is tampering with probe wiring to defeat the overfill protection normally provided by the device (for example, by connecting one working probe to two channels or more). (Because repair of a defective probe may require removal of a tank truck from service, a tank truck operator may wrongly resort to cheating if a probe becomes faulty and will not allow filling of the tank truck on which it is mounted.) Moreover, the problems of corrosion and aging effects, accidental mis-wiring of probes, and so-called "cheating" can not always be easily discovered, even by observant station attendants.

It would be desirable to provide an overfill protection device that can readily test for each of the above mentioned common problems and others that can affect the operation of such a device and the safety of transported or stored flammable fluids and other combustible material.

It would also be desirable to provide an overfill protection device that is configurable for the number of active probes which will be used in the field with the unit.

DESCRIPTION OF THE INVENTION

SUMMARY OF THE INVENTION

The present invention resides in a probe excitation and testing ("PET") system that can apply either a normal excitation or a "small" bias test excitation to overfill protection probes mounted within storage and transport tanks used to store, e.g., flammable fluids. The PET system applies the normal excitation for normal operation of the probes to provide overfill protection, and applies a "small" bias test excitation to the probes for performing diagnostic tests, including anti-cheating. Having at least two excitation currents allows the use of standard probes or newer, low-power, probes without requiring a difference in the diagnostic limits.

The PET system can also perform a probe "signature" validation test under normal excitation. The signature test ascertains whether each probe is responding to normal excitation in accordance with specifications relating to characteristic parameters of the probe's normal output waveform, e.g., duty cycle, magnitude, and period, i.e., it has a normal "signature." The "signature" test can also determine if the wrong probe type is attached.

The magnitude of the so-called "small" bias test excitation used in the diagnostic tests is selected to assure that it is insufficient to power the probes (as is the current supplied to the probe during normal operation) to sense overfill conditions. It is desirable for the outcome of the diagnostic tests conducted at the bias test excitation to be independent of the condition of the tanks, i.e., whether the tanks are filled or not filled.

The diagnostic tests conducted by the PET system include a probe interaction test, an unauthorized connection test, and an open/short circuit test. These tests can indicate the existence of any of the following: channel by-pass faults (e.g., cheating), channel-to-channel short faults, unauthorized connection faults, open circuit faults, and short circuit faults.

The PET system has logic that compares the outcomes of the tests with predetermined thresholds that indicate proper operation of the probes, and produces a FLOW_PERMIT signal, i.e., the sensor signal mentioned above, to indicate whether any of the tests have been failed. In response to the FLOW_PERMIT signal, the overfill protection device can enable or disable filling of the tanks.

BRIEF DESCRIPTION OF THE DRAWINGS

For a fuller understanding of the nature of the invention, reference should be had to the following detailed description taken in connection with the accompanying drawings, in which.

DETAILED DESCRIPTION OF THE PREFERRED EMBODIMENT

Figure 1:
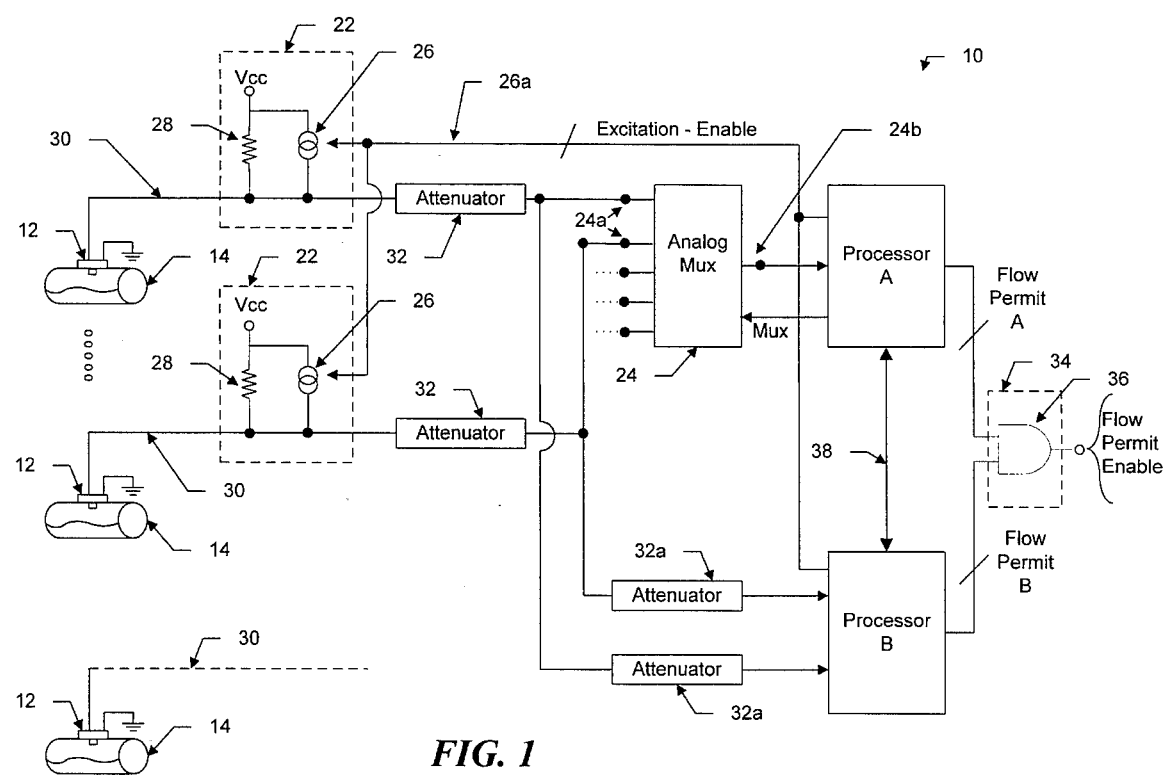
FIG. 1 is a block diagram, partly in schematic form, of a probe excitation and testing system in accordance with the invention.

FIG. 1 shows an intrinsically-safe, fail-safe PET system 10 in accordance with the invention for providing excitation to a plurality of overfill protection probes 12, each mounted within a tank 14. The PET system 10 can also perform diagnostic tests with respect to the probes 12 connected to the system, and perform a test to validate the characteristic "signatures" of the probes.

The PET system 10 includes a plurality of probe excitation supplies 22 (each corresponding to one of the overfill protection probes), an analog multiplexer 24 and processors A and B. Both processors A and B produce output signals, called, respectively, FLOW_PERMIT_A and FLOW_PERMIT_B, that are combined to control filling of the tanks 14.

Each probe excitation supply 22 includes a conventional current source 26 and a biasing resistor 28, both connected between a voltage supply $V_{cc}$ and a probe channel 30. The probe channel 30 is connected to the corresponding overfill protection probe 12. Each probe channel 30 is a conductor or wire over which voltage signals to and from a corresponding probe 12 pass. The current source 26 can supply a current at a preselected level.

The probe excitation supply 22 supplies a normal operating current to the probe 12 connected thereto when the current source 26 is enabled or supplies a "small" bias test current (e.g., under 300 microamps) equal to the voltage across the biasing resistor 28 (due to voltage source $V_{cc}$) divided by its resistive value when the current source 26 is not enabled. The processor A controls the operation of the probe excitation supply 22 using an EXCITATION_ENABLE signal received by the current source 26. When EXCITATION_ENABLE is asserted, the normal operating current is applied to the probe 12, and, when deasserted, the bias test current is applied.

The magnitude of the so-called "small" bias test current should be selected to assure that it is insufficient to power the probe, as is the normal operating current, to sense overfill conditions. It is desirable for the outcome of the diagnostic tests conducted at the bias test current to be independent of the condition of the tanks, i.e., whether the tanks are filled or not filled.

Depending on the embodiment, the EXCITATION_ENABLE signal can be applied to all current sources 26 at the same time over signal link 26a or can be applied to individual current sources 26 separately, in which case signal link 26a is, e.g., a separate line connected to each excitation supply 22.

The multiplexer 24 responds to a MUX control signal from processor A to monitor voltages on selective ones of the channels 30 on a time-division basis. The multiplexer has a plurality of input terminals 24a, each connected to one of the channels 30 via a resistive attenuator 32, and has an output terminal 24b for passing the voltage at a selected one of its input terminals 24a to the output terminal 24b in response to the control signal. Preferably, the multiplexer 24 serially scans each of the input terminals 24a, by passing the voltage on each, in turn, to the output terminal 24b. The magnitudes of the voltages into the multiplexer 24 can be scaled down, i.e., attenuated by attenuator 32, to meet input voltage specifications for that device. The multiplexer 24 provides the selected voltage on its output terminal 24b to the processor A.

For testing of the probes 12, the processor A monitors and processes the output voltages from the probes during testing that result from the application of the normal or small bias test current. Then, depending on the outcome of the tests, processor A produces an output signal, i.e., FLOW_PERMIT_A, which is asserted, e.g., HIGH, when the probes are operating and wired properly, and is deasserted, e.g., LOW, when they are not.

Figure 2:
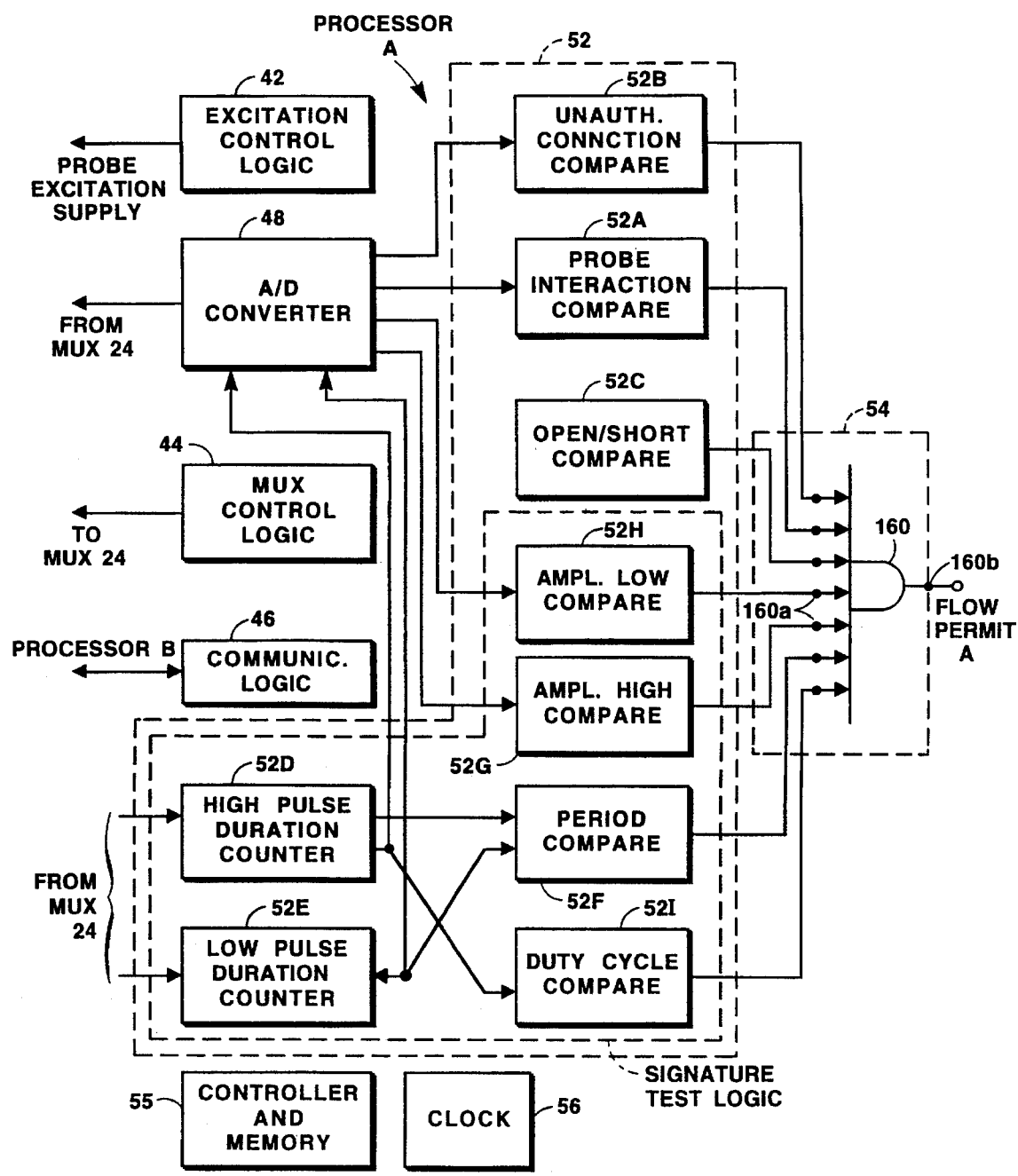
FIG. 2 is a block diagram of processor A of FIG. 1.

Specifically, FIG. 2 depicts processor as including excitation control logic 42, multiplexer control logic 44, communication logic 46, an analog-to-digital (A/D) converter 48, test logic 52, a combinational logic unit 54, a controller and memory unit 55 for controlling the operation of the other components, and a clock 56 for providing timing signals for the other components. The excitation control logic 42 controls the assertion of EXCITATION_ENABLE, and thus controls whether normal or bias test currents are applied to the probes 12. The multiplexer control logic 44 generates the MUX control signal, which controls the operation of the multiplexer 24, as described above. The communication logic 46 controls communication with processor B over a communication link 38. The A/D converter 48 converts the multiplexer output voltages from analog form into digital form, i.e., a digital representation of the analog voltage. The test logic 52 of processor A performs tests to determine whether the probes 12 are operating and are wired properly. The specific tests that are conducted will be described shortly.

The combinational logic 54 of processor A combines the results of the tests performed by the test logic 52 of processor A. If the tests performed by logic 52 indicate that probes 12 are operating and wired properly, combinational logic 54 produces a signal to so indicate, e.g., asserts FLOW_PERMIT_A to signify proper operation and wiring, and deasserts that signal to signify improper operation or wiring.

As noted above, the processor B also take part in the testing of the probes 12. The processor B monitors the operation of processor A to assure that processor A is operating properly, performs one or more of the tests in conjunction with processor A, and performs one or more tests performed also by processor A for redundancy to assure fail safe operation in case processor A misfunctions. The processor B produces FLOW_PERMIT_B, which is asserted, e.g., HIGH, when the probes are operating and wired properly, and is deasserted, e.g., LOW, when they are not.

Figure 3:
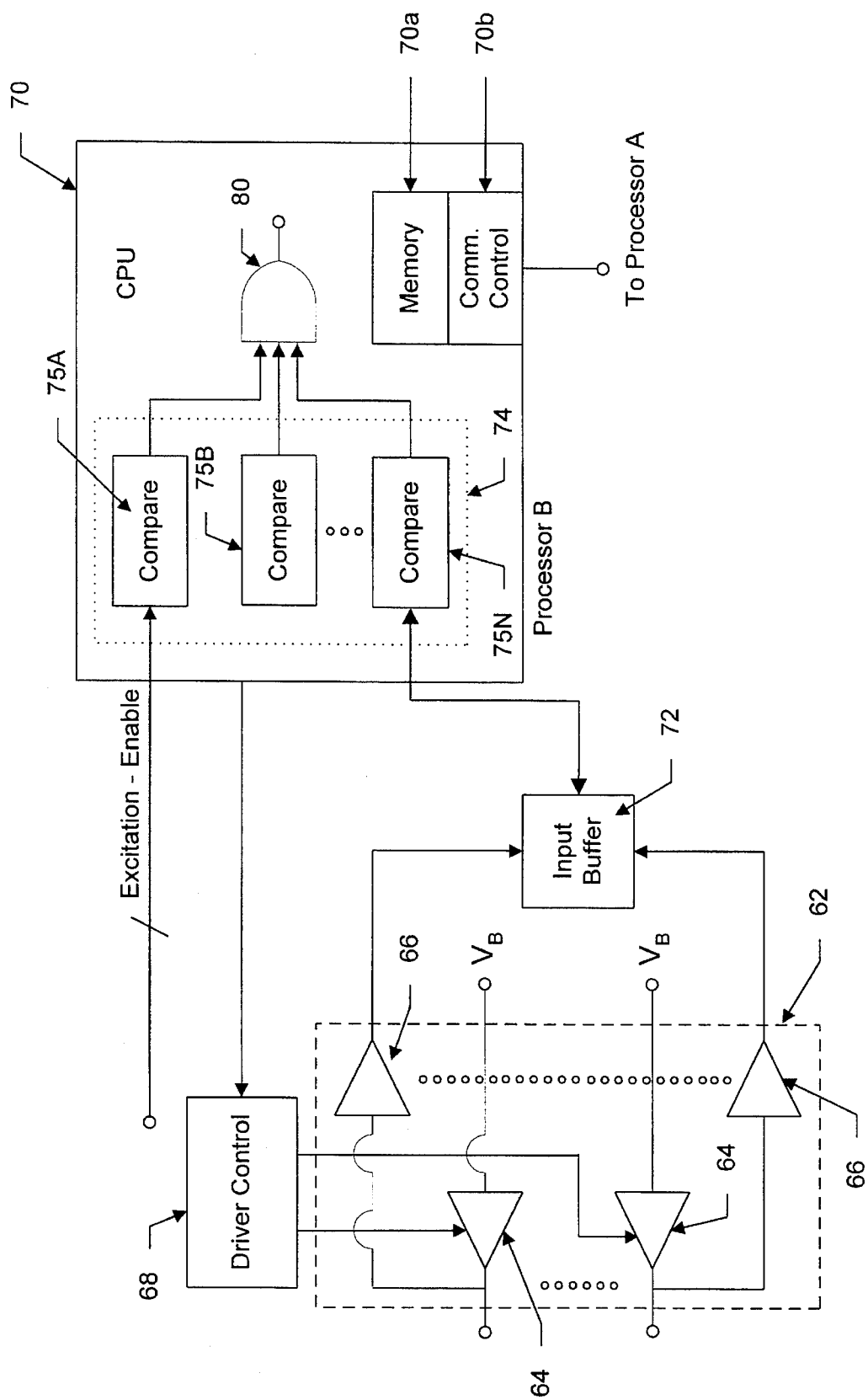
FIG. 3 is a block diagram of processor B of FIG. 1.

Specifically, FIG. 3 shows processor B as including a transceiver 62 having a plurality of drivers 64, one connected to apply a fixed voltage $V_B$, e.g., 5 volts, to an associated resistive attenuator 32a. The attenuator 32a converts the fixed voltage into an additional test current that is applied to an associated one of the channels 30 for performing certain diagnostic tests, as described below. For those tests, the combination of the additional test current and the bias test current should not be sufficient to power to the probes 12 to sense overfill. A driver control unit 68 controls the operation of the drivers 64 and the selective application of the additional test currents to the channels 30 under commands from a central processing unit ("CPU") 70. In particular, the driver control unit 68 can place each of the drivers 64 into a low output impedance state to apply the aforementioned test currents or a high output impedance state to effectively disconnect the drivers from the circuit.

The transceiver 62 of processor B also has a plurality of receivers 66, one connected to receive output voltages over an associated channel 30. The output voltages are provided to an input buffer 72, and then to test logic 74 within the CPU 70. The CPU 70 includes one or more comparators 75A, 75B, . . . , 75N for performing one or more tests on the received probe voltages, including, e.g., diagnostic tests and a special test to determine if processor A is operating properly.

The CPU 70 also has a conventional memory 70a, e.g., for storing configuration data indicating which channels 30 are supposed to have probes 12 attached, and a communication control unit 70b for controlling communication with processor A.

The test logic 74 of processor B generates TEST OUTCOME signals that indicate whether the channels 30 and probes 12 have passed the tests. The test logic 74 provides the TEST OUTCOME signals as inputs to a combinational logic unit 80, such as an AND gate. If the TEST OUTCOME signals indicate that the channels 30, probes 12 and the processor A are operating properly, the combination logic 70 produces a signal to so indicate, e.g., asserts FLOW_PERMIT_B to signify proper operation and wiring. On the other hand, if the TEST OUTCOME signals indicate that the channels 30 and probes 12 are operating improperly, FLOW_PERMIT_B is deasserted to signify improper operation or wiring.

With reference again to FIG. 1, the PET system's combinational logic 34, e.g., AND gate 36, produces an enable signal called FLOW_PERMIT_ENABLE in response to its input signals, i.e., FLOW_PERMIT_A and FLOW PERMIT B. Specifically, when both of those input signals are asserted, FLOW_PERMIT_ENABLE is asserted, and, otherwise, it is deasserted. FLOW_PERMIT_ENABLE controls flow into the tanks 14 (e.g., by disabling pumping equipment (not shown) or by closing flow valves (not shown)), and is the "sensor signal" mentioned hereinabove.

Processors A and B can each be a conventional microprocessor, e.g., Motorola 68HC11 which is available from Motorola, Austin, Tex., which has been appropriately programmed, or can be implemented using discrete logic. Advantageously, processors A and B can be programmed so that they operate with different numbers of probes, for example, from one probe up to the maximum number of probes for which the unit is designed. The ability to program the unit to operate with different numbers of probes allows the unit to be tailored to a particular operating environment. Thus, a single unit type can be used in all situations and some of the probe channels inactivated if they are unused. Inactivation of unused channels by software control avoids the use of probe simulators which were used to de-activate unused channels in prior art controllers and which could also be used to improperly bypass the controllers.

Probe Channel Testing

The tests performed by the PET system 10 of FIGS. 1–3 will now be described with additional reference to FIGS. 4–7. The PET system 10 tests the probes 12 for various possible fault conditions, as follows:

1) Channel By-pass fault ( i.e., more than one channel 30 is connected to a single probe 12, as may arise, e.g. during "cheating");

2) Channel-to-channel short fault (i.e., two or more probes 12 or channels 30 are electrically connected together);

3) Unauthorized connection fault (i.e., a probe 12 of unauthorized design or operating specifications has been connected (or other unauthorized connection has been made) to a channel of the system 10, which, according to configuration data stored in the system 10, is not supposed to have a probe attached (i.e., an inactive channel));

4) Open circuit fault (i.e., no probe is connected to one of the channels which, according to configuration data stored in the PET system 10, is supposed to have a probe attached (i.e., an active channel));

5) Short circuit fault (i.e., a probe or channel is electrically connected to ground or a high voltage line); and 6) Signature fault (i.e., a probe or channel fails to meet specifications under normal operating excitation, as determined by analyzing, e.g., duty cycle, frequency, magnitude and/or period of the output voltage therefrom).

The PET system 10 applies the small bias test current to the channels 30 to check for faults (1) through (5), and applies the normal operating current in validating probe signatures with respect to fault (6). Both processors A and B take part in testing for faults (1), (2) and (6) in the above list, while only processor A is involved in testing for faults (3) through (5). Other embodiments of the invention may use a single processor in performing all the tests and otherwise controlling the operation of the PET system 10, or may allocate test performance and control responsibilities between the processors A and B in ways other than these described herein. However, the single processor embodiment may not be fail safe.

Figure 4:
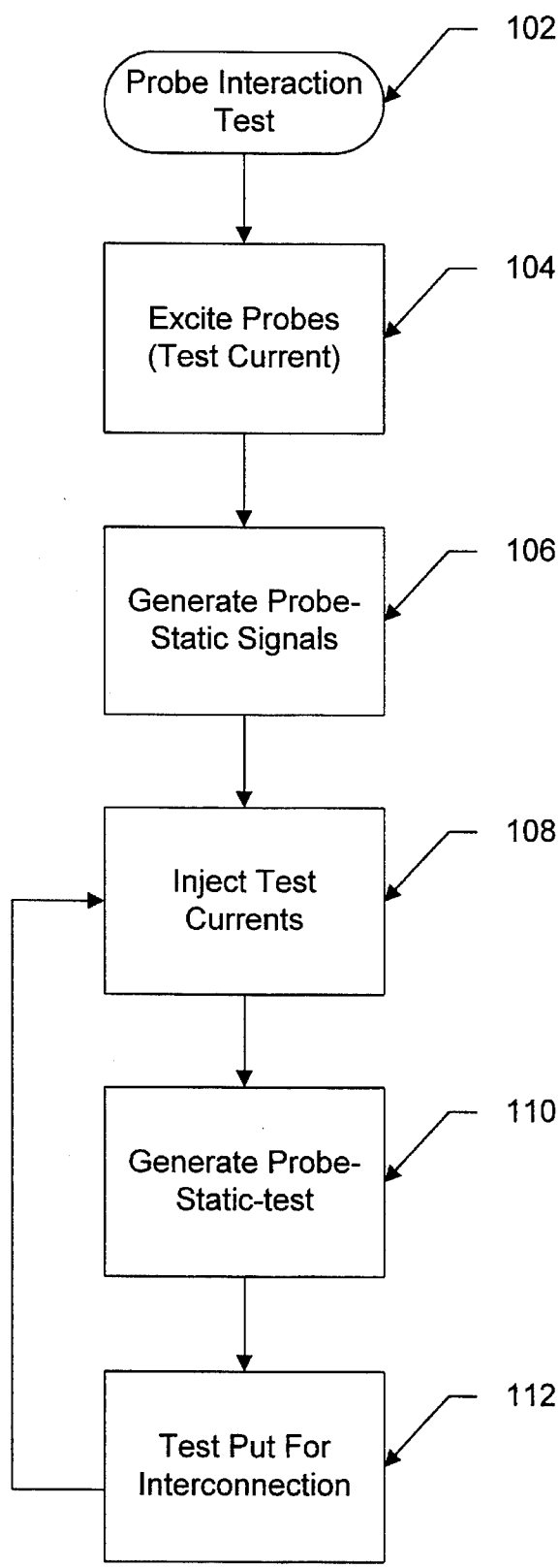
FIG. 4 is a block diagram of a probe interaction test, as performed by the probe excitation and testing system of FIG. 1.

FIG. 4 is a block diagram illustrating a probe interaction test 102 for channel by-pass faults and channel-to-channel short faults. In performing the probe interaction test 102, the PET system 10 excites all the probe channels 30, in step 104, with the small, bias current, under the control of processor A.

Then, after the probe output stabilizes, in step 106, the PET system 10 monitors the output voltages on the probe channels 30. The probe output voltages are individually provided to the A/D converter 48 via the multiplexer 24, under the control of processor A. The A/D converter 48 generates a digital representation of each voltage, called PROBE_STATIC. The signals PROBE_STATIC serves as a basis for comparison for the main portion of the test 102.

Next, in step 108, processor A commands processor B over the communication link 38 to inject an additional test current into preselected probe channels 30, i.e., into each probe channel 30 except for a particular probe 12 and probe channel 30 to be tested, which together are called the "probe-under-test" or "PUT". Other embodiments may also apply test currents selectively to a single channel or a selected group of channels in order to more selectively test channel combinations.

In step 110, in response to the applied bias test current and the injected test current, the PUT produces an output voltage, which the multiplexer 24 passes to the A/D converter 48. The converter 48 converts that PUT output voltage into digital signal, called PROBE_STATIC_TEST.

Finally, in step 112, the PET system 10 tests for probe interaction by comparing, in comparator 52A of processor A of FIG. 2, the PROBE_STATIC_TEST signal with the PROBE_STATIC signal previously obtained for the particular PUT. If the difference between those signals is more than a preselected limit, i.e., if the PUT has been excited by the application of the test currents to channels other than the PUT, the PET system 10 concludes that an electrical interaction (e.g., an electrical connection) between another probe 12 or channel 30 and the PUT is indicated. As a consequence, the probe channels 30 fail the probe-interaction test 102, and the output of the comparator 52A is driven LOW. Otherwise, steps 108 through 110 are repeated with a different probe/channel being designated as the PUT until all have been tested. If no probe interaction is found for any of the PUT's, the output of comparator 52A is driven HIGH.

Note that if, as described above, the processor B injects the additional test current at the same time to all the probes 12 except the PUT, the probe interaction test 102 can not identify which probes or channels, if any, are electrically connected; it can indicate only that there is an electrical interaction. If the identification of the interconnected probes or channels is desired, the processor B can inject the additional test current one channel at a time for each PUT, and the test 102 can repeat steps 110 and 112 for each injected test current. Then, the test outcome signal for test 102 could identify the channels 30 that are electrically interacting with one another. Even then, the test 102 can not reveal the nature of the connection, e.g., whether it was intentionally made to "cheat."

Figure 5:
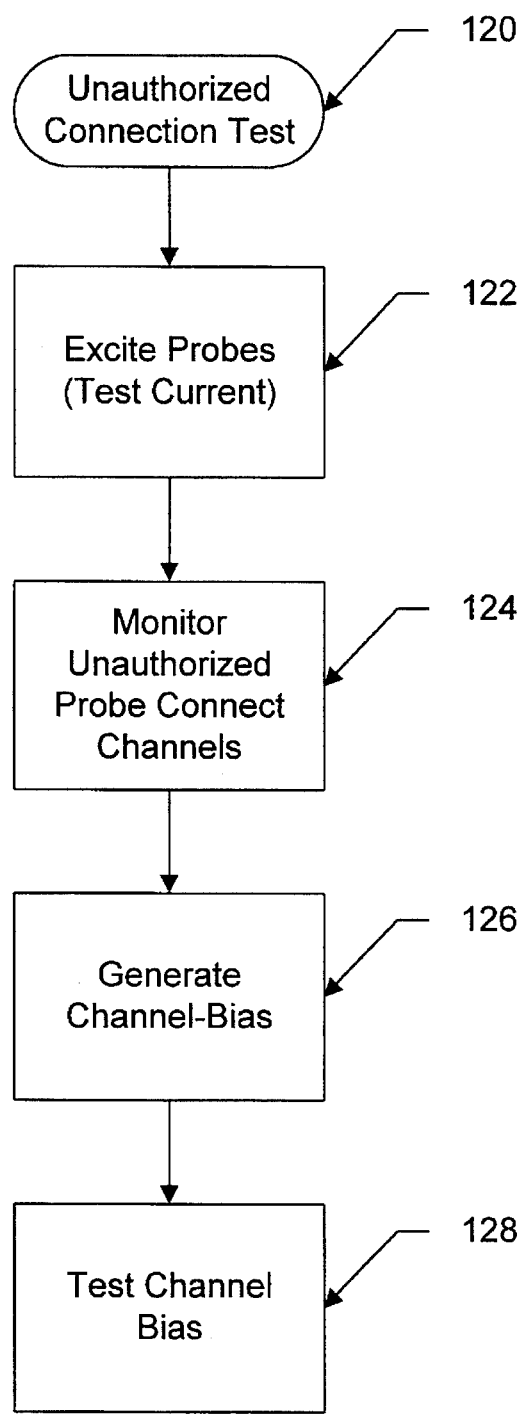
FIG. 5 is a block diagram of an unauthorized connection test, as performed by the probe excitation and testing system of FIG. 1.

FIG. 5 is a block diagram illustrating an unauthorized connection test 120 for unauthorized connection faults. In performing the test 120, the PET system 10 excites all the probe channels 30, in step 122, with the bias test current, under the control of processor A.

Then, after the channel output stabilizes, in step 124, the PET system 10 monitors the channels 30 that the configuration data stored in the memory 55 indicate should not have any connections made thereto, i.e., the "unauthorized connection" channels. Accordingly, the output voltage from the unauthorized connection channels 30 should be open-circuit voltages.

In step 126, the A/D converter 48 changes the open-circuit voltage obtained for each unauthorized connection channel 30 to a digital signal, called CHANNEL_BIAS.

Finally, in step 128, the unauthorized connection comparator 52B compares CHANNEL_BIAS with a range of preselected proper values. If CHANNEL_BIAS is outside that range, then the unauthorized connection test 120 indicates that an unauthorized connection has been made to at least one of the channels 30, e.g., an unauthorized probe has been attached. As a consequence, in either case, the channels 30 fail the unauthorized connection test, and the output of the comparator 52B is driven LOW; otherwise it is driven HIGH.

Figure 6:
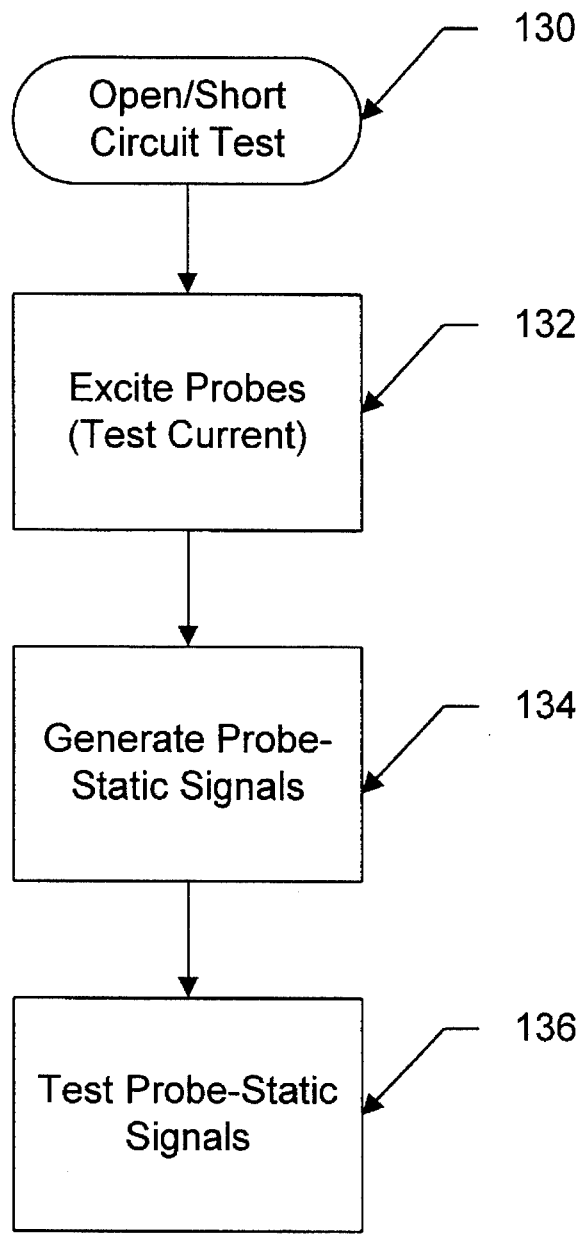
FIG. 6 is a block diagram of an open/short circuit test, as performed by the probe excitation and testing system of FIG. 1.

FIG. 6 is a block diagram illustrating an open/short circuit test 130 for open or short circuit faults. In performing this test 130, the PET system 10 excites all the probe channels 30, in step 132, with the bias test current, under the control of processor A.

Then, after the probe output stabilizes, in step 134, the PET system 10 monitors the probe channels 30, and, in step 136, converts each of the resulting probe output voltages into a digital representation, again called PROBE_STATIC.

In step 136, the individual PROBE_STATIC signals are compared in comparator 52C with a first set of preselected limits in conducting a short-circuit portion of the test 130. For each, if PROBE_STATIC is higher than an upper limit, the test 130 indicates that the corresponding probe channel 30 has been electrically connected (i.e., shorted) to a high voltage line, and, if PROBE_STATIC is lower than a lower limit, the test 130 indicates that the corresponding channel 30 has been electrically connected (i.e., shorted) to ground. As a consequence, in either case, the channels 30 fail the short circuit portion of the test 130.

The PROBE_STATIC signals are also compared in comparator 52C with a range defined by a second set of preselected limits. If the PROBE_STATIC signals fall within the second set of limits, the test 130 indicates that the corresponding channel 30 is open circuited. If the configuration data indicates that channel 30 was supposed to have a probe attached, and the test results indicate an open circuit exists for that channel, the channels 30 fail the open-circuit portion of test 130.

If test 130 is failed, either with respect to the short-circuit or open-circuit portions of the test, the output of the comparator 52C is driven LOW; otherwise it is driven HIGH.

Figure 7:
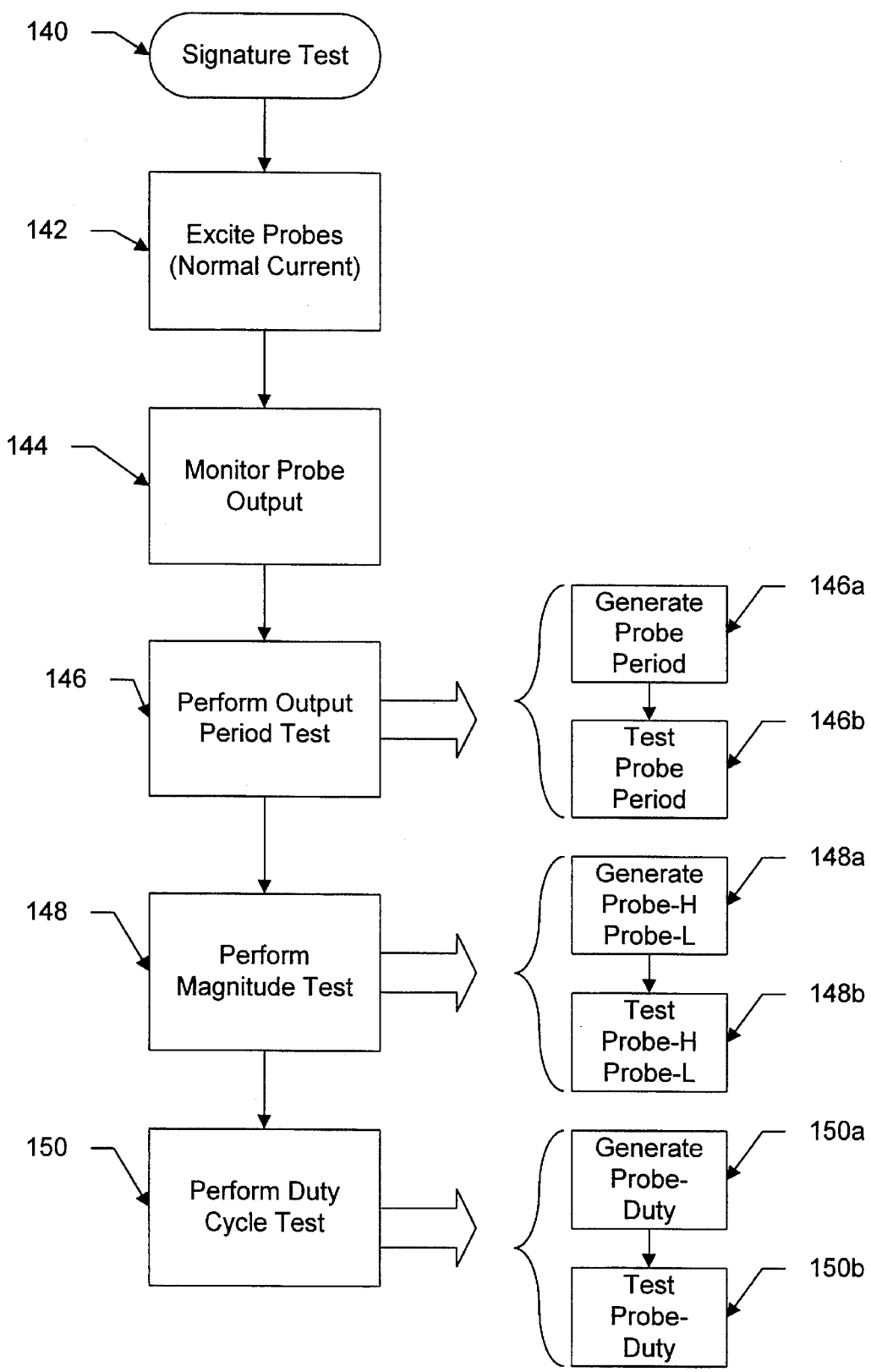
FIG. 7 is a block diagram of a probe signature validation test, as performed by the probe excitation and testing system of FIG. 1.

FIG. 7 is a block diagram illustrating a signature validation test 140 for determining probe signature, i.e., whether characteristic parameters (e.g., period, duty cycle, and amplitude) of the waveform of the probe's output voltage under normal excitation fall within predetermined ranges, so as to determine whether the probes 12 are of authorized types that are known to provide adequate overfill protection. The signature validation test 140 is actually a battery of sub-tests, one for each of a plurality of the waveform parameters.

In performing the signature test 130, the PET system 10 excites all the probe channels 30, in step 142, with the normal operating current from the probe excitation supply 22.

Then, after the probe output stabilizes, in step 144, the PET system 10 monitors the output voltages on the "authorized" probe channels 30, i.e., those which the stored system configuration information indicates should have probes attached. The PET system 10 measures the duration of the positive half cycle and the negative half cycle of the each of the monitored output voltages, called $t_1$ and $t_2$, and the amplitude of each monitored output voltage at a selected time or times during each, called respectively $A_1$ and $A_2$. The duration $t_1$ of the positive half cycle is determined by the high pulse duration counter 52D, and the duration $t_2$ is determined by the low pulse duration counter 52E.

In step 146, the PET system 10 performs a probe period test in a period comparator 54F by generating a signal, PROBE_PERIOD, (step 146a) representing the period of the output voltage, i.e., $t_1+t_2$. Then, the comparator 58F compares PROBE_PERIOD with preselected limits defining a range of proper period values (step 146b). If PROBE_PERIOD falls outside that range, the period test 146 indicates that the corresponding probe channel 30 has a probe attached that is not meeting specifications concerning the period of its output, and thus may not protect against overfill of the tank 14. As a consequence, the probe channels 30 fail the probe period test and the output of the comparator 52F is driven LOW; otherwise it is driven HIGH.

In step 148, the PET system 10 performs a probe magnitude test by using the A/D converter 48 to generate a digital representation of the high and low amplitudes $A_1$, $A_2$ for each output voltage, called PROBE-HIGH and PROBE-LOW (step 148a). Then, the magnitude test compares (step 148b) these digital signals with corresponding preselected limits in the amplitude high and amplitude low comparators 54G and 54H. If PROBE_HIGH is lower than the corresponding limit or if PROBE_LOW is above the corresponding limit, the probe is not operating to specification, e.g., due to probe damage or aging. As a consequence, the probe channels 30 fail the magnitude test, and the output of the respective comparator 52G or 54H is driven LOW; otherwise it is driven HIGH.

In step 150, the PET system 10 performs a probe duty cycle test in duty-cycle comparator 54I by generating a signal, called PROBE_DUTY, (step 150a) representing the duty cycle (i.e., $t_1/(t_1+t_2)$) of the output waveform. Then, the comparator 54I compares (step 150b) PROBE_DUTY with preselected limits defining a range of proper duty-cycle values. If PROBE_DUTY falls outside that range, the duty-cycle test 150 indicates that the corresponding probe channel 30 has been attached to a probe that is not meeting specifications concerning the duty cycle of its output, and thus may not protect against overfill of the tank 14. As a consequence, the probe channels 30 fail the duty cycle test, and the output of the comparator 52I is driven LOW; otherwise it is driven HIGH.

The combinational logic 54 includes, e.g., an AND gate 160, which receives the output signals from the comparators 52A, 52B, 52C, 54F, 54G, 54H, 54I at its input terminals 160a, and, if all are asserted HIGH produces a HIGH value for FLOW_PERMIT_A at its output terminal 160b to indicate that the probe channels 30 have passed the tests. Otherwise, if any of the input terminals 160a are driven LOW, the AND gate 160 produces a LOW value for FLOW_PERMIT_A to indicate that the probe control channels 30 have failed the tests.

Figure 8:
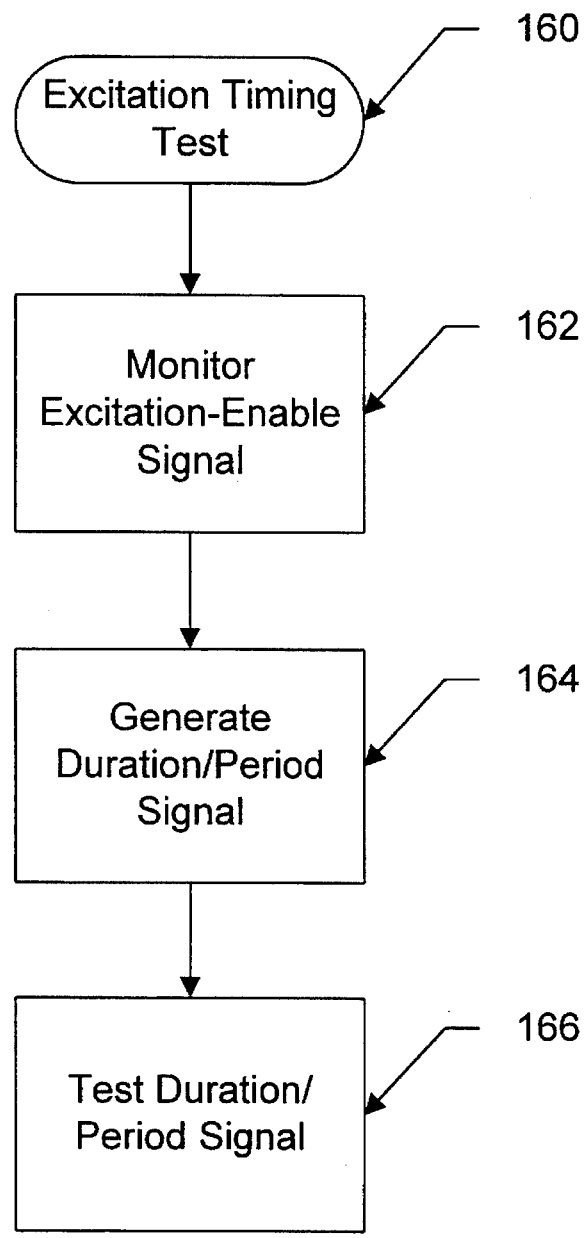
FIG. 8 is a block diagram of a excitation timing test, as performed by the probe excitation and testing system of FIG. 1.

FIG. 8 is a block diagram illustrating an excitation timing test 160 for verifying that processor A is disabling the normal operating current to the channels 30 for a period of time just sufficient to conduct the other diagnostic tests. This assures that the diagnostic tests will not interfere with overfill protection.

In step 162 of test 160, the processor B monitors the EXCITATION_ENABLE signal. When that signal goes LOW, a diagnostic test is being conducted. In step 164, processor B measures the duration of the LOW state and the periodicity of the EXCITATION_ENABLE signal, and, in response, generates a DURATION signal and a PERIOD signal.

In step 166, the DURATION signal and the PERIOD signal are compared in comparator 75A with preselected limits. If those signals fall outside those limits, test 160 indicates that the processor A is not operating properly. As a consequence, the output of the comparator 75A is driven LOW to disable filling; otherwise it is driven HIGH to disable filling to disable filling.

Thus, it will be seen that an improved method and apparatus for testing overfill protection devices has been described. The terms and expressions which have been employed are used as terms of description and not of limitation. In the use of such terms and expressions, there is no intention of excluding any equivalents of the features shown and described or portions thereof. It is recognized that various modifications are possible within the scope of the invention claimed.

What is claimed is:

1. A probe excitation and testing, "PET", system for an overfill protection device including a probe mounted in a tank for sensing a level of material therein, said probe operable to produce a probe output signal in response to a normal operating excitation of at least a preselected magnitude being applied thereto, said PET system comprising:

A) processor means for conducting any of a plurality of diagnostic tests and for generating an excitation control signal;

B) channel means for coupling said processor means with said probe, said diagnostic tests conducted by said processor means being able to determine whether said probe and said channel means can operate within preselected limits; and C) excitation means coupled with said channel means and responsive to said excitation control signal for applying said normal operating excitation to provide overfill protection during filling of said tank, and for applying a bias test excitation to said probe instead of said normal operating excitation during said diagnostic test, said bias test excitation having a magnitude less than the preselected magnitude of said normal operating excitation and insufficient to power said probe to provide overfill protection yet being sufficient to conduct said diagnostic test.

2. The PET system in accordance with claim 1, wherein said excitation control signal has a preselected characteristic, and said processor means includes a first processor for generating said excitation control signal; and a second processor for monitoring said excitation control signal and for producing an output disable signal to indicate that said excitation control signal characteristic exceeds a predetermined threshold.

3. The PET system in accordance with claim 1, wherein said processor means includes first logic means for determining whether said probe operates within predetermined limits when said normal excitation is applied thereto.

4. The PET system in accordance with claim 1, wherein said processor means includes second logic means for determining whether said probe operates within predetermined limits when said bias test excitation is applied thereto.

5. The PET system in accordance with claim 1, wherein said overfill protect on system includes a second channel, and said processor means includes third logic means for determining whether an electrical connection exists between said channel and said second channel.

6. The PET system in accordance with claim 1, wherein said overfill protection system includes a second channel, and said processor means includes fourth logic means for determining whether an unauthorized connection has been made to said second channel.

7. The PET system in accordance with claim 1, wherein said processor means includes fifth logic means for determining whether said channel has been electrically connected to a high voltage line.

8. The PET system in accordance with claim 1, wherein said processor means includes sixth logic means for determining whether said channel has been electrically connected to a ground.

9. A method of conducting a probe signature validation test in a probe excitation and testing, "PET", system for an overfill protection device, the method comprising the steps of:
   A) providing a probe which, in response to a normal operating excitation of at least a predetermined magnitude, produces a probe output signal having a characteristic time-variant parameter;
   B) providing a processor which generates said normal operating excitation and is responsive to signals received;
   C) connecting the probe to the processor with a signal channel;
   D) exciting said probe with said normal operating excitation transmitted along said channel by the processor;
   E) monitoring said channel with the processor for said probe output signal resulting from said excitation to detect said characteristic time-variant parameter; and
   F) testing said detected characteristic parameter to determine whether it falls within a predetermined range.

10. The method in accordance with claim 9, wherein said step of providing a probe includes providing a probe which produces a probe output signal having a plurality of characteristic parameters which include a positive half cycle amplitude, a negative half cycle amplitude, a period, and a duty cycle.

11. The method in accordance with claim 10, wherein said monitoring step includes the steps of measuring the duration of the positive half cycle of the probe output signal, the duration of the negative half cycle of the probe output signal and the amplitude of the output signal at a preselected time during each of said half cycles; and wherein said testing step includes the steps of:
   A) performing a probe period test by generating, with the processor, a period signal representing the period of the output voltage, comparing, with the processor, the period signal with preselected limits defining a range of proper period values and, if the period signal falls outside said range, generating an output of the processor indicating that said probe does not meet specifications;
   B) performing a probe magnitude test by generating, with the processor, an amplitude signal representative of a high and low value of the amplitude of the output signal, comparing the amplitude signal with preselected limits stored in the processor for said high and low amplitudes, and generating an output of the processor indicating that said probe does not meet specifications concerning the amplitudes if the high amplitude represented by said amplitude signal is lower than the stored limit for said high amplitude or if the low amplitude represented by the amplitude signal is higher than the stored limit for said low amplitude; and
   C) performing a probe duty cycle test by generating, with the processor, a duty cycle signal representative of the duty cycle of the output signal, comparing, with the processor, said duty cycle signal with preselected limits stored in the processor that define a range of duty-cycle values, and, if the duty cycle signal falls outside said range, generating an output signal with the processor indicating that said probe does not meet specifications.

12. A method of conducting a probe interaction test for determining channel by-pass and channel-to-channel faults in a probe excitation and testing, "PET", system for an overfill protection device, said method comprising the steps of:
   A) providing a plurality of probes, each operable to produce a probe output signal in response to a normal operating excitation of at least a preselected magnitude;
   B) providing connection to each probe with one of a plurality of probe channels;
   C) exciting said probe channels with a test excitation having a magnitude that is less than the preselected magnitude;
   D) monitoring probe responses present on the probe channels which result from the test excitation;
   E) converting the monitored probe responses into a first signal representation;
   F) exciting all of said probe channels with an additional test excitation except for a channel connected to a preselected probe to be tested;
   G) monitoring probe responses on each probe channel generated in response to said additional test excitation;
   H) converting said monitored probe responses from step (G) into a second signal representation; and
   I) comparing said first and second signal representations.

13. A method of conducting an unauthorized connection test in a probe excitation and testing, "PET", system for an overfill protection device, said method comprising the steps of:
   A) providing a plurality of probes, each operable to produce a probe output signal in response to a normal operating excitation of at least a preselected magnitude;
   B) providing a plurality of probe channels some of which are connected to the probes and some of which are idle channels, not connected to a probe;
   C) exciting said probe channels with a test excitation having a magnitude that is less than the preselected magnitude;
   D) monitoring each idle probe channel for response signals present thereupon; and
   E) comparing said response signals with a predetermined threshold.

14. A method of conducting an open and short circuit test in a probe excitation and testing, "PET", system for an overfill protection device, said method comprising the steps of:

A) providing a plurality of probes, each operable to produce a probe output signal in response to a normal operating excitation of at least a preselected magnitude;

B) providing connection to each probe with one of a plurality of probe channels;

C) exciting said probe channels with a test excitation having a magnitude that is less than the preselected magnitude;

D) monitoring for a probe response on each probe channel; and

E) comparing each monitored probe response with i) a first threshold level representative of a predetermined voltage; ii) with a second threshold level representative of a short circuit; and iii) with a third predetermined threshold level representative of an open circuit.

* * * * *